US 12,044,176 B2

(12) United States Patent
Holley et al.

(10) Patent No.: US 12,044,176 B2
(45) Date of Patent: Jul. 23, 2024

(54) TURBINE ENGINES HAVING HYDROGEN FUEL SYSTEMS

(71) Applicant: RTX Corporation, Farmington, CT (US)

(72) Inventors: Brian M. Holley, Eastford, CT (US); Joseph B. Staubach, Colchester, CT (US); Marc J. Muldoon, Marlborough, CT (US); Charles E. Lents, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/860,756

(22) Filed: Jul. 8, 2022

(65) Prior Publication Data
US 2023/0304439 A1  Sep. 28, 2023

Related U.S. Application Data

(60) Provisional application No. 63/220,161, filed on Jul. 9, 2021.

(51) Int. Cl.
*F02C 7/224* (2006.01)
*F02C 3/20* (2006.01)
(Continued)

(52) U.S. Cl.
CPC .............. *F02C 7/224* (2013.01); *F02C 3/20* (2013.01); *F02C 7/222* (2013.01); *F02C 7/228* (2013.01); *F02C 7/232* (2013.01)

(58) Field of Classification Search
CPC .......... F02C 7/222; F02C 7/224; F02C 7/228; F02C 7/232; F02C 3/20
See application file for complete search history.

(56) References Cited

U.S. PATENT DOCUMENTS

| 3,237,400 A | * | 3/1966 | Kuhrt | F02C 7/224 |
| | | | | 60/260 |
| 3,237,401 A | * | 3/1966 | Peters | F02C 7/224 |
| | | | | 60/260 |

(Continued)

FOREIGN PATENT DOCUMENTS

| CN | 108750123 B | 10/2020 |
| EP | 2643579 B1 | 9/2014 |

(Continued)

OTHER PUBLICATIONS

Extended European Search Report dated Dec. 7, 2022; EP Application 22184221.4-1004; 7 pages.

(Continued)

*Primary Examiner* — William H Rodriguez
(74) *Attorney, Agent, or Firm* — CANTOR COLBURN LLP

(57) ABSTRACT

Aircraft propulsion systems and aircraft are described. The aircraft propulsion systems include aircraft systems having at least one hydrogen tank and an aircraft-systems heat exchanger and engine systems having at least a main engine core, a high pressure pump, a hydrogen-air heat exchanger, and an expander, wherein the main engine core comprises a compressor section, a combustor section having a burner, and a turbine section. Hydrogen is supplied from the at least one hydrogen tank through a hydrogen flow path, passing through the aircraft-systems heat exchanger, the high pressure pump, the hydrogen-air heat exchanger, and the expander, prior to being injected into the burner for combustion.

14 Claims, 4 Drawing Sheets

(51) Int. Cl.
*F02C 7/22* (2006.01)
*F02C 7/228* (2006.01)
*F02C 7/232* (2006.01)

(56) References Cited

U.S. PATENT DOCUMENTS

| | | | | |
|---|---|---|---|---|
| 3,241,311 | A * | 3/1966 | Kuhrt | F02C 1/007 |
| | | | | 60/269 |
| 3,452,541 | A * | 7/1969 | Builder | F02K 7/08 |
| | | | | 62/910 |
| 3,616,779 | A * | 11/1971 | Newkirk | F02M 21/0224 |
| | | | | 123/553 |
| 4,272,953 | A | 6/1981 | Rice | |
| 5,163,285 | A | 11/1992 | Mazeaud et al. | |
| 5,363,641 | A * | 11/1994 | Dixon | F02C 6/08 |
| | | | | 60/788 |
| 5,392,595 | A | 2/1995 | Glickstein et al. | |
| 5,924,307 | A | 7/1999 | Nenov | |
| 7,208,239 | B2 | 4/2007 | Hoffjann et al. | |
| 7,555,893 | B2 | 7/2009 | Okai et al. | |
| 8,049,353 | B1 * | 11/2011 | Eng | F02N 11/006 |
| | | | | 290/1 A |
| 9,422,889 | B2 | 8/2016 | Conrardy et al. | |
| 9,932,124 | B2 * | 4/2018 | Kamath | F02C 9/40 |
| 10,125,692 | B2 | 11/2018 | Ernst | |
| 10,989,117 | B2 * | 4/2021 | Roberge | F02C 3/22 |
| 11,434,823 | B2 * | 9/2022 | Roberge | F02C 7/224 |
| 11,603,798 | B1 * | 3/2023 | Terwilliger | F02C 3/22 |
| 11,661,889 | B1 * | 5/2023 | Muldoon | F02C 3/22 |
| | | | | 415/116 |
| 11,708,766 | B2 | 7/2023 | Angel et al. | |
| 11,773,782 | B2 | 10/2023 | Johnson et al. | |
| 2006/0185347 | A1 * | 8/2006 | Knapp | F01C 13/04 |
| | | | | 60/269 |
| 2006/0222919 | A1 * | 10/2006 | Tanaka | H01M 8/04022 |
| | | | | 429/414 |
| 2008/0028765 | A1 | 2/2008 | Bartlett | |
| 2014/0230778 | A1 * | 8/2014 | Grannell | F02M 25/038 |
| | | | | 123/25 P |
| 2014/0300109 | A1 | 10/2014 | Palmer et al. | |
| 2014/0301826 | A1 | 10/2014 | Palmer et al. | |
| 2015/0033792 | A1 | 2/2015 | Lissianski et al. | |
| 2015/0337730 | A1 | 11/2015 | Kupiszewski et al. | |
| 2016/0123226 | A1 * | 5/2016 | Razak | F02C 7/18 |
| | | | | 60/39.15 |
| 2018/0112142 | A1 | 4/2018 | Foody et al. | |
| 2019/0063257 | A1 | 2/2019 | Fioravanti et al. | |
| 2019/0162121 | A1 * | 5/2019 | Staubach | F02C 7/32 |
| 2020/0040848 | A1 | 2/2020 | Hanrahan et al. | |
| 2020/0088099 | A1 | 3/2020 | Roberge | |
| 2020/0088102 | A1 * | 3/2020 | Roberge | F02C 7/224 |
| 2020/0400372 | A1 | 12/2020 | Castellucci et al. | |
| 2021/0047970 | A1 | 2/2021 | Collopy et al. | |
| 2021/0293243 | A1 | 9/2021 | Ghezzi et al. | |
| 2021/0332759 | A1 | 10/2021 | Smith et al. | |
| 2021/0340908 | A1 * | 11/2021 | Boucher | F02C 3/22 |
| 2021/0348561 | A1 * | 11/2021 | Cocks | F02C 7/12 |
| 2021/0370223 | A1 | 12/2021 | Stuckert | |
| 2022/0099299 | A1 * | 3/2022 | Carrotte | F02C 7/143 |
| 2022/0195928 | A1 | 6/2022 | Johnson et al. | |
| 2022/0221220 | A1 | 7/2022 | Thomas et al. | |
| 2022/0243667 | A1 | 8/2022 | Rambo | |
| 2022/0297844 | A1 * | 9/2022 | Mackin | B64C 21/08 |
| 2022/0299205 | A1 | 9/2022 | Macdonald et al. | |
| 2022/0364513 | A1 * | 11/2022 | Muldoon | F02C 3/22 |
| 2022/0376280 | A1 * | 11/2022 | Shao | H01M 8/04225 |
| 2023/0010158 | A1 * | 1/2023 | Muldoon | F02C 9/40 |
| 2023/0011956 | A1 * | 1/2023 | Wiedenhoefer | F02C 7/222 |
| 2023/0056536 | A1 | 2/2023 | Boucher et al. | |
| 2023/0080053 | A1 | 3/2023 | Emerson et al. | |
| 2023/0092811 | A1 * | 3/2023 | Palmer | F02C 7/222 |
| | | | | 60/39.281 |
| 2023/0237208 | A1 | 7/2023 | Malisani | |
| 2023/0250754 | A1 | 8/2023 | Muldoon | |
| 2024/0010351 | A1 | 1/2024 | Holley et al. | |
| 2024/0010352 | A1 | 1/2024 | Holley et al. | |

FOREIGN PATENT DOCUMENTS

| | | |
|---|---|---|
| EP | 3855002 A2 | 7/2021 |
| EP | 3904658 A1 | 11/2021 |
| EP | 3907387 A1 | 11/2021 |
| EP | 4019752 A1 | 6/2022 |
| EP | 4089271 A1 | 11/2022 |
| FR | 2967725 A1 | 5/2012 |

OTHER PUBLICATIONS

Simon, et al.; "Joint Cryogentic Engine Stucy"; Int. J. Hydrogen Energy; vol. 19, No. 7; pp. 617-623; 7 pages; (1994).
International Search Report for International Application No. PCT/US2022/036500; Date of Search Aug. 29, 2023, 5 pages.
Written Opinion for International Application No. PCT/US2022/036500; Date of Search Aug. 29, 2023, 9 pages.
Extended European Search Report; Application No. EP 23184291.5; Mailed Dec. 6, 2023; 9 pages.
Schmittz, O et al., "Aero Engine Concepts Beyond 2030: PART 1—The Steam Injecting and Recovering Aero Engine", Proceedings of ASME Turbo Expo 2020 Turbomachinery Technical Conference and Exposition GT2020, Sep. 21-25, 2020, Virtual, Online, 12 pages.
Schmitz, O. et al., "Aero Engine Concepts Beyond 2030: PART 3—Experimental Demonstration of Technological Feasbility" Proceedings of ASME Turbo Expo 2020 Turbomachinery Technical Conference and Exposition GT2020 Sep. 21-25, 2020, 12 pages.

* cited by examiner

TURBINE ENGINES HAVING HYDROGEN FUEL SYSTEMS

CROSS-REFERENCE TO RELATED APPLICATIONS

This application claims the benefit of U.S. Provisional Application No. 63/220,161 filed Jul. 9, 2021, the disclosure of which is incorporated herein by reference in its entirety.

TECHNICAL FIELD

The present disclosure relates generally to turbine engines and aircraft engines, and more specifically to employing hydrogen fuel systems and related systems with turbine and aircraft engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, aircraft propulsion systems are provided. The aircraft propulsion systems include aircraft systems comprising at least one hydrogen tank and an aircraft-systems heat exchanger; and engine systems comprising at least a main engine core, a high pressure pump, a hydrogen-air heat exchanger, and an expander, wherein the main engine core comprises a compressor section, a combustor section having a burner, and a turbine section; wherein hydrogen is supplied from the at least one hydrogen tank through a hydrogen flow path, passing through the aircraft-systems heat exchanger, the high pressure pump, the hydrogen-air heat exchanger, and the expander, prior to being injected into the burner for combustion.

In addition to one or more of the features described above, or as an alternative, embodiments of the aircraft propulsion systems may include that the aircraft-systems heat exchanger is a hydrogen-to-air heat exchanger.

In addition to one or more of the features described above, or as an alternative, embodiments of the aircraft propulsion systems may include that the aircraft-systems heat exchanger is part of a cabin air conditioning system of an aircraft.

In addition to one or more of the features described above, or as an alternative, embodiments of the aircraft propulsion systems may include that the engine systems include an engine-side generator configured to generate at least 300 kw of electrical power.

In addition to one or more of the features described above, or as an alternative, embodiments of the aircraft propulsion systems may include that the aircraft systems include an auxiliary power source configured to receive hydrogen from the at least one hydrogen tank to generate power.

In addition to one or more of the features described above, or as an alternative, embodiments of the aircraft propulsion systems may include that the auxiliary power source is a fuel cell.

In addition to one or more of the features described above, or as an alternative, embodiments of the aircraft propulsion systems may include that the auxiliary power source includes a burner for combusting the hydrogen to generate power.

In addition to one or more of the features described above, or as an alternative, embodiments of the aircraft propulsion systems may include that the auxiliary power source is connected to a generator to generate power onboard an aircraft.

In addition to one or more of the features described above, or as an alternative, embodiments of the aircraft propulsion systems may include that the auxiliary power source is configured to generate at least 100 kw of electrical power.

In addition to one or more of the features described above, or as an alternative, embodiments of the aircraft propulsion systems may include at least one pump arranged along the hydrogen flow path between the at least one hydrogen tank and the aircraft-systems heat exchanger.

In addition to one or more of the features described above, or as an alternative, embodiments of the aircraft propulsion systems may include that the expander is arranged between the hydrogen-air heat exchanger and the burner along the hydrogen flow path.

In addition to one or more of the features described above, or as an alternative, embodiments of the aircraft propulsion systems may include that the engine systems further include an engine-side generator operably connected to the expander and configured to generate electrical power.

In addition to one or more of the features described above, or as an alternative, embodiments of the aircraft propulsion systems may include a valve arranged along the hydrogen flow path between the expander and the burner, the valve configured to control a flow of hydrogen into the burner.

In addition to one or more of the features described above, or as an alternative, embodiments of the aircraft propulsion systems may include that the hydrogen enters the expander at temperatures up to the auto-ignition temperature of the hydrogen.

According to some embodiments, aircraft are provided. The aircraft include a main engine core having a compressor section, a combustor section having a burner, and a turbine section, aircraft systems including at least one hydrogen tank and an aircraft-systems heat exchanger arranged remote from the main engine core. A hydrogen flow path is configured to supply hydrogen from the at least one hydrogen tank to the burner of the combustor section. The hydrogen flow path includes the aircraft-systems heat exchanger in the aircraft systems, a hydrogen high pressure pump downstream of the first heat exchanger, a hydrogen-air heat exchanger and arranged about the main engine core, wherein the hydrogen exits the hydrogen-air heat exchanger at temperatures up to the auto-ignition temperature of the hydrogen.

In addition to one or more of the features described above, or as an alternative, embodiments of the aircraft may include an expander arranged between the hydrogen-air heat exchanger and the burner along the hydrogen flow path.

In addition to one or more of the features described above, or as an alternative, embodiments of the aircraft may include an engine-side generator operably coupled to the expander and configured to generate electrical power.

In addition to one or more of the features described above, or as an alternative, embodiments of the aircraft may include a valve arranged along the hydrogen flow path between the expander and the burner, the valve configured to control a flow of hydrogen into the burner.

In addition to one or more of the features described above, or as an alternative, embodiments of the aircraft may include that the aircraft-systems heat exchanger is a hydrogen-to-air heat exchanger and is part of an onboard environmental control system of the aircraft.

In addition to one or more of the features described above, or as an alternative, embodiments of the aircraft may include that the aircraft systems include an auxiliary power source configured to receive hydrogen from the at least one hydrogen tank to generate power.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
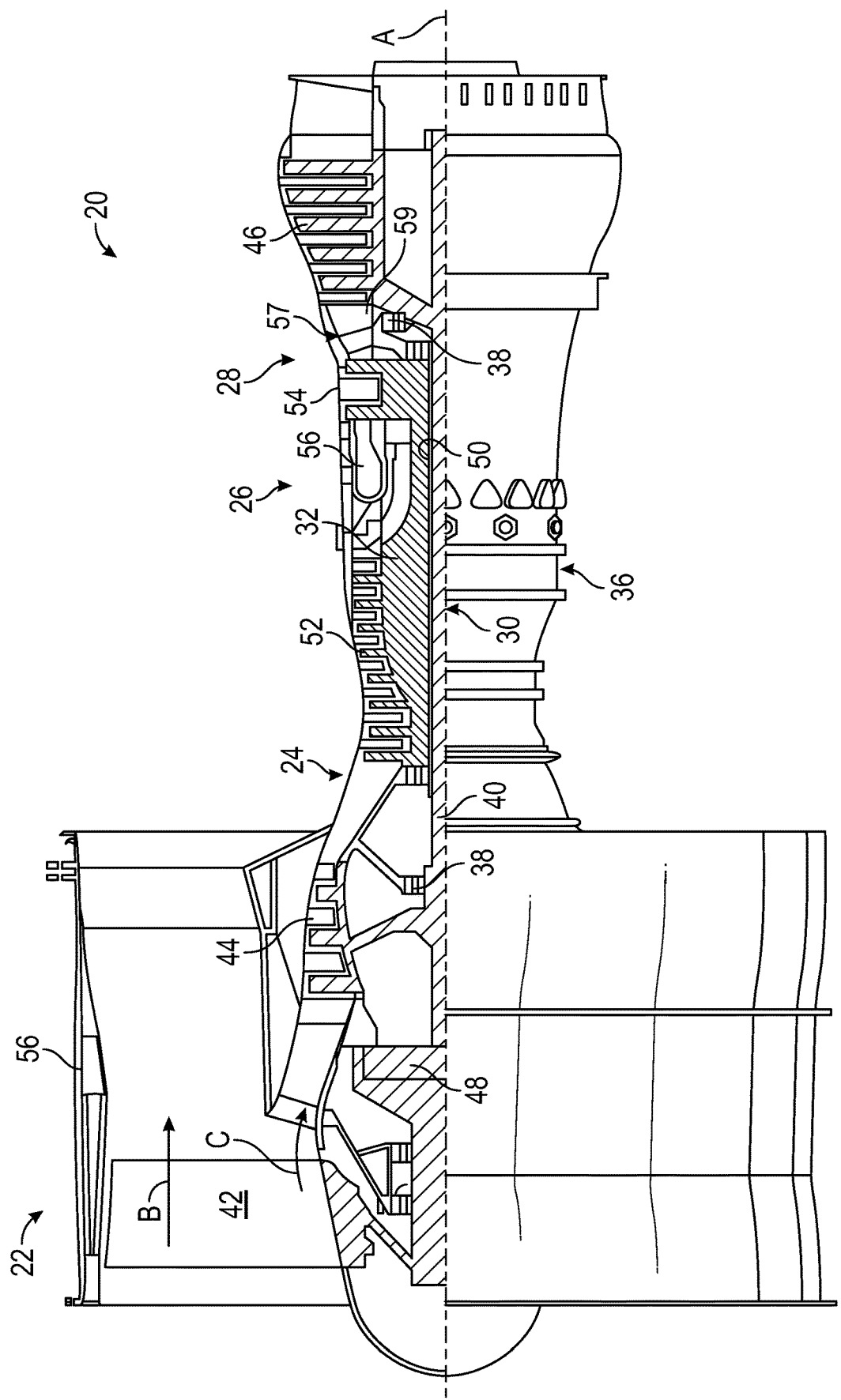
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may provide significant advantages, as described herein.

Figure 2:
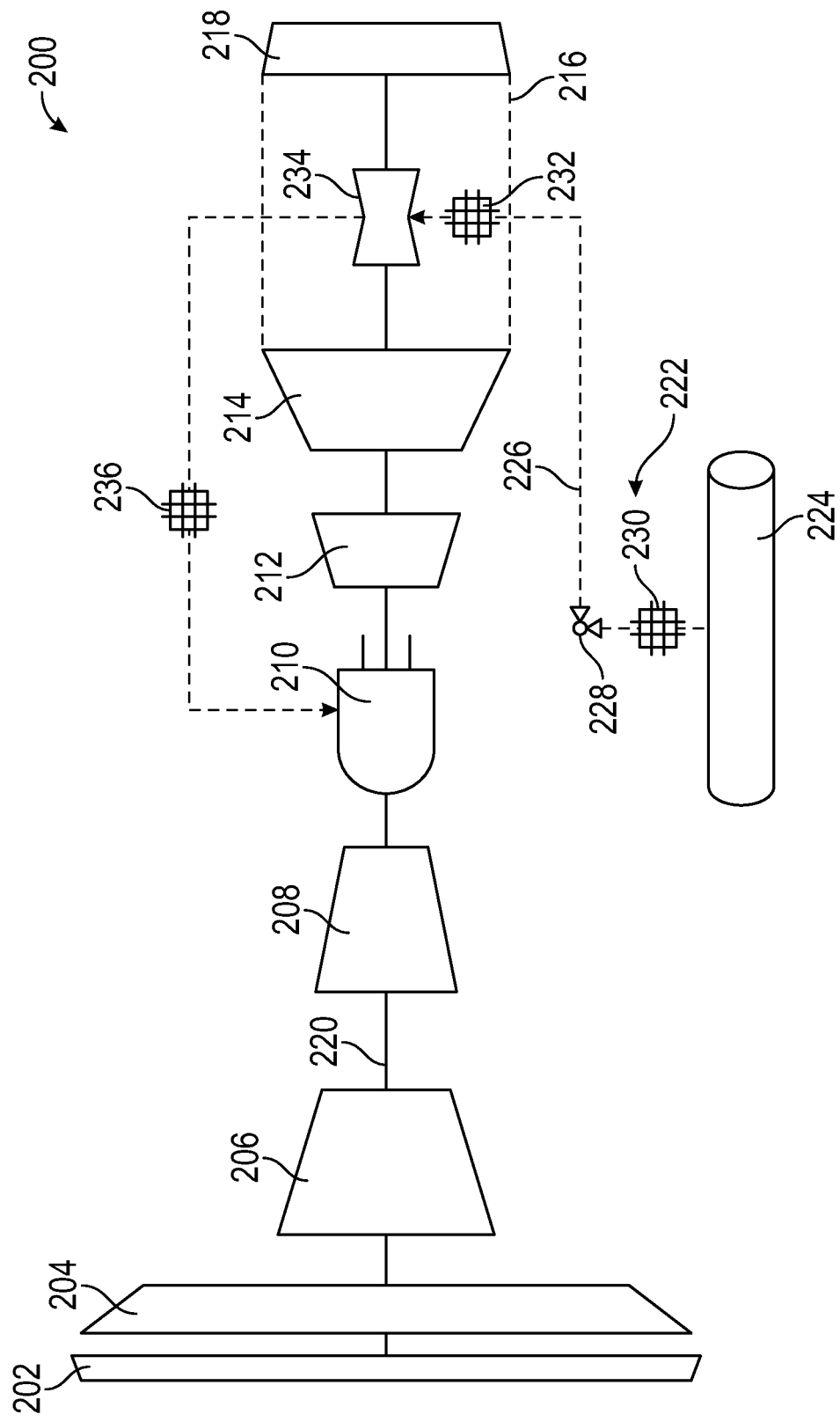
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206,208, the turbine 212, 214, and the combustor sections 210. The compressor 206, 208, the turbine 212, 214, and the fan 204 are arranged along a shaft 220.

As shown, the turbine engine system 200 includes a hydrogen fuel system 222. The hydrogen fuel system 222 is configured to supply a hydrogen fuel from a hydrogen fuel tank 224 to the combustor 210 for combustion thereof. In this illustrative embodiment, the hydrogen fuel may be supplied from the hydrogen fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can be configured to provide cooling to various systems onboard an aircraft by using the hydrogen as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the hydrogen fuel tank 224 as a first working fluid and a component-working fluid for a different onboard system. For example, the heat exchanger 230 may be configured to provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump or other means to increase a pressure of the hydrogen sourced from the hydrogen fuel tank 224 may be arranged upstream of the heat exchanger 230. This pumping or pressure increase may be provided to pump the hydrogen to high pressure as a liquid (low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchangers. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and as the second working fluid may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors, as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Because the hydrogen is heated from a cryogenic or liquid state in the hydrogen fuel tank 224 through the various mechanisms along the flow supply line 226, combustion efficiency may be improved.

Figure 3:
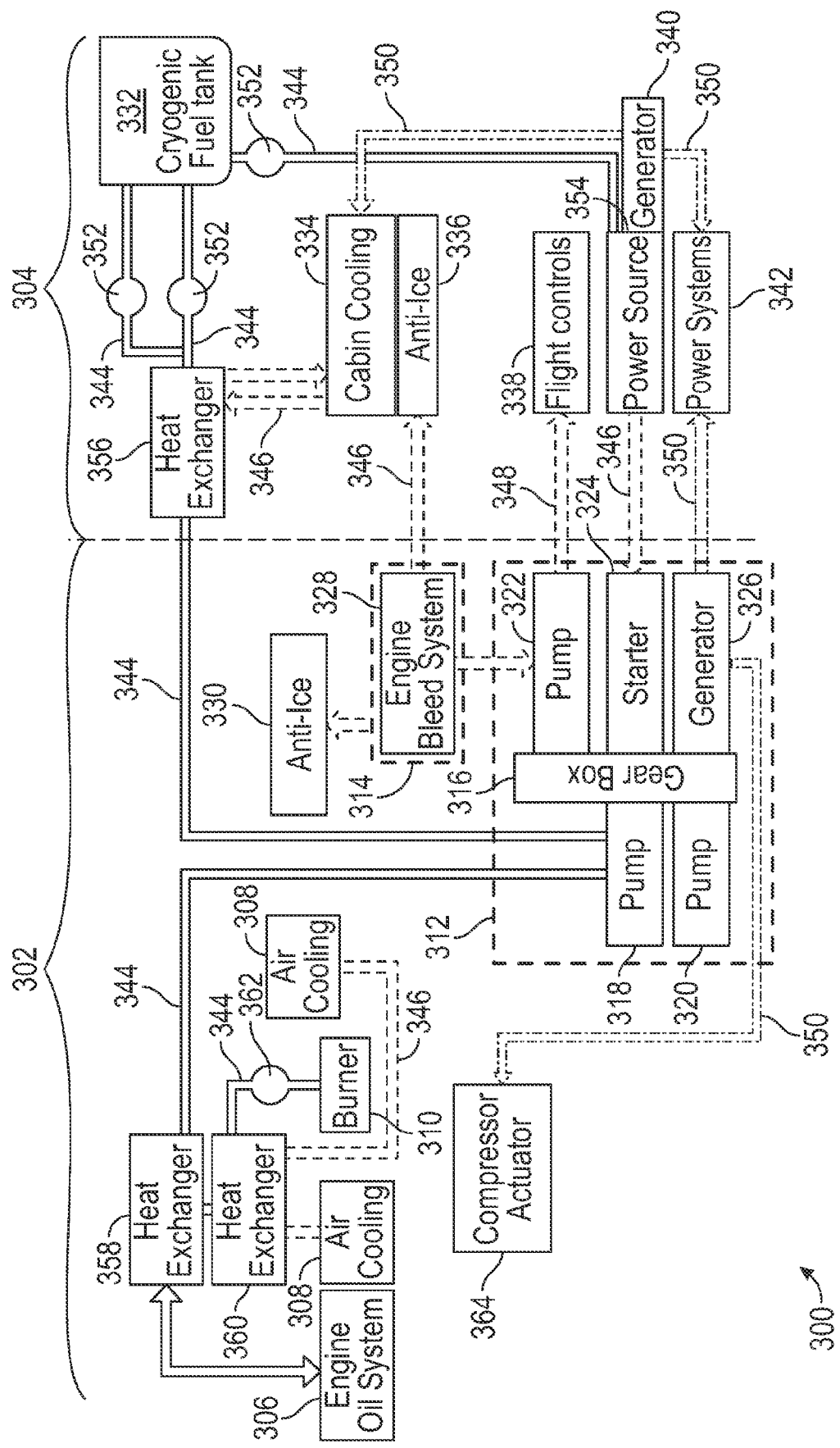
FIG. 3 is a schematic diagram of an aircraft propulsion system in accordance with an embodiment of the present disclosure.

Turning now to FIG. 3, a schematic diagram of an aircraft propulsion system 300 is shown. The aircraft propulsion system 300 includes engine systems 302 and aircraft systems 304. In accordance with embodiments of the present disclosure, the engine systems 302 include components, devices, and systems that are part of an aircraft engine, which may be wing-mounted or fuselage-mounted and the aircraft systems 304 are components, devices, and systems that are located separately from the engine, and thus may be arranged within various locations on a wing, within a fuselage, or otherwise located onboard an aircraft.

The engine systems 302 may include the components shown and described above, including, without limitation, a fan section, a compressor section, a combustor section, a turbine section, and an exhaust section. In this schematic illustration, without limitation, the engine systems 302 include an engine oil system 306, an air cooling system 308, a burner 310 (e.g., part of a combustion section), a gear box system 312, and an anti-ice system 314. Those of skill in the art will appreciate that other systems, components, and devices may be incorporated into the engine system 302, and the illustrative embodiment is merely for explanatory and illustrative purposes. The gear box system 312, as shown, includes a main gear box 316 with various components operably connected thereto. In this illustrative embodiment, a hydrogen high pressure pump 318, an oil pump 320, a hydraulic pump 322, an air turbine starter 324, and a generator 326 may all be operably connected to the main gear box 316 of the gear box system 312. The anti-ice system 314 of the engine systems 302 includes an engine bleed system 328 that is configured to supply warm air to a cowl anti-ice system 330 to prevent ice buildup on an engine cowl.

The aircraft systems 304 include various features installed and present that are separate from but may be operably or otherwise connected to one or more of the engine systems 302. In this illustrative, non-limiting configuration, the aircraft systems 304 include one or more hydrogen tanks 332 configured to store liquid hydrogen onboard the aircraft, such as in tanks that are wing-mounted or arranged within the aircraft fuselage. The aircraft systems 304 include a cabin air cooling system 334, a wing anti-ice system 336, flight controls 338, one or more generators 340, and aircraft power systems 342.

The schematic diagram in FIG. 3 of the aircraft propulsion system 300 illustrates flow paths for different working fluids. For example, a hydrogen flow path 344 represents a flow path of liquid (or gaseous) hydrogen from the hydrogen tanks 332 to the burner 310. One or more air flow paths 346 represent airflow used for cooling and heat exchange with the hydrogen, and thus one or more heat exchangers or exchange systems may be provided to enable heat transfer from the air to the hydrogen, to cool the air and warm the hydrogen. A hydraulic fluid flow path 348 is illustrated fluidly connecting the hydraulic pump 322 to the flight controls 338. An electrical path 350 illustrates power generated by the generator 326 and distribution of such power (e.g., from generators 326, 340 to aircraft power systems 342 and other electrical systems onboard an aircraft). As shown, one or more of the paths 344, 346, 348, 350 may cross between the engine systems 302 and the aircraft systems 304.

Referring to the hydrogen flow path 344, liquid hydrogen may be sourced or supplied from the hydrogen tanks 332. One or more pumps 352 may be arranged to boost a pressure of the hydrogen as it is supplied from the hydrogen tanks 332. In some configurations, the pumps 352 may be low pressure pumps, providing an increase in pressure of about 20 psid to 50 psid, for example. The hydrogen may be supplied to one or more combustion systems. For example, a portion of the hydrogen may be supplied to an auxiliary power source 354, such as an auxiliary power unit having a burner or a fuel cell. The auxiliary power source 354 may be configured to direct air to the air turbine starter 346 along a leg of an air flow path 346. Further, this auxiliary power source 354 may be configured to generate power at the generator 340 to supply power to the aircraft power system 342 and/or the cabin air cooling system 334 and other ECS systems.

For propulsion onboard the aircraft, a portion of the hydrogen may be supplied from the hydrogen tanks 332 along the hydrogen flow path 344 to a first heat exchanger 356 which may include a hydrogen-air heat exchanger to cool air. One or more low pressure pumps 352 may be arranged to boost a pressure and thus heat the hydrogen before entering the first heat exchanger 356. The first heat exchanger 356 may be part of an environmental control system (ECS) of the aircraft. The cooled air may be supplied, for example, to the cabin air cooling system 334. As this air is cooled, the hydrogen will be warmed within the first heat exchanger 356. The warmed hydrogen may then be passed through the hydrogen high pressure pump 318 which may further increase the pressure of the warmed hydrogen to maintain a pressure above a combustor pressure and/or above a critical pressure in order to avoid a phase change to gas in the plumbing, piping, flow path, or heat exchangers, for example.

The boosted pressure hydrogen may then be conveyed to a second heat exchanger 358. The second heat exchanger 358 may be a hydrogen-oil heat exchanger to cool engine oil of the engine systems 302. As such, the second heat exchanger 358 may be part of a closed loop of the engine oil system 306. In the second heat exchanger 358, the temperature of the hydrogen is further raised. Next, the hydrogen may be passed through a third heat exchanger 360. The third heat exchanger 360 may be a hydrogen-air heat exchanger. The third heat exchanger 360 may be part of an engine cooling system to supply air from one section of the engine systems 302 to another part of the engine systems 302 (e.g., from compressor section to turbine section, or from turbine section to compressor section). The cooled air generated in the third heat exchanger 360 may be used for cooling air (e.g., for a turbine) and/or for buffer air within compartments of the engine systems 302. The third heat exchanger 360 may thus use warm engine air for heating the hydrogen, but also cooling such air for air-cooling schemes of the engine systems 302. A valve 362 may be arranged to control a flow of the heated hydrogen into the burner 310. In some embodiments, and as shown, an electric compressor actuator 364 may be included within the engine systems 302. The electric compressor actuator 364 may be configured to boost a pressure of the hydrogen prior to injection into the burner 310.

Using the architecture illustrated in FIG. 3, and in accordance with embodiments of the present disclosure, the hydrogen may be used as a heat sink to provide increased cooling capacity as compared to other cooling schemes. For example, using liquid or supercritical hydrogen can, in some configurations, provide up to ten times the cooling capacity of prior systems. The hydrogen may be used at various locations along the hydrogen flow path 344 to provide cooling to one or more systems, as noted above. For example, the hydrogen can provide cooling to onboard electronics, generators, air for cooling purposes, etc. The pumps 318, 352 act to increase the pressure of the hydrogen. Use of low pressure pumps (e.g., pumps 352) can allow cooling of cooler heat sources at lower pressure (e.g., onboard electronics), whereas a high pressure pump (e.g., pump 318) can be used for higher pressure heat sources (e.g., generators 326, 340). Further, because the hydrogen is low temperature at the first heat exchanger 356, the hydrogen may act as an efficient heat sink for air. As such, the cabin air conditioning system 334 and other aspects of onboard ECS can be reduced in size, weight, and complexity.

It will be appreciated that the aircraft propulsion system 300 is an air breathing system. That is, the combustion of the hydrogen within the burner 310 is a mixture of pure hydrogen supplied from the hydrogen tanks 332 into the burner 310 where it is combusted in the presence of air pulled into the engine through a fan or the like. The aircraft propulsion system 300 may be substantially similar in construction and arrangement to a hydrocarbon-burning system (e.g., convention gas turbine engine) that burns, for example, jet fuel. The turbine of the aircraft propulsion system 300 is thus driven by an output of the burner, similar to a convention gas turbine engine. Because the aircraft propulsion system 300 is an air-breathing system that relies upon combustion, a flow rate of the hydrogen into the burner 310, as controlled in part by the valve 362, may be relatively low (e.g., around 0.2 pounds per second at cruise or around 0.025 pounds per second at minimum idle).

As described herein, aircraft propulsion systems are described that include a main engine core and a hydrogen fuel source, with the main engine core configured to burn the hydrogen to drive rotation of components of the main engine core. For example, the main engine core can include, at least, a compressor section, a combustor section, and a turbine. The main engine core is air breathing and the combustor section is configured to burn a mixture of hydrogen (sourced from onboard hydrogen tanks) and air. The combustion output is used to drive rotation of the turbine section, which in turn drives rotation of the compressor section. As such, in view of the above description, the engine systems described with respect to FIG. 3 may be considered part of or components of the main engine core. Separate, yet connected, systems are part of the aircraft systems, which are remote from the engine systems. As described above, the engine systems may be wing mounted or fuselage installed, whereas the aircraft systems may be distributed about all other aspects of an aircraft (e.g., wings, cabins, cockpit, fuselage, etc.).

Figure 4:
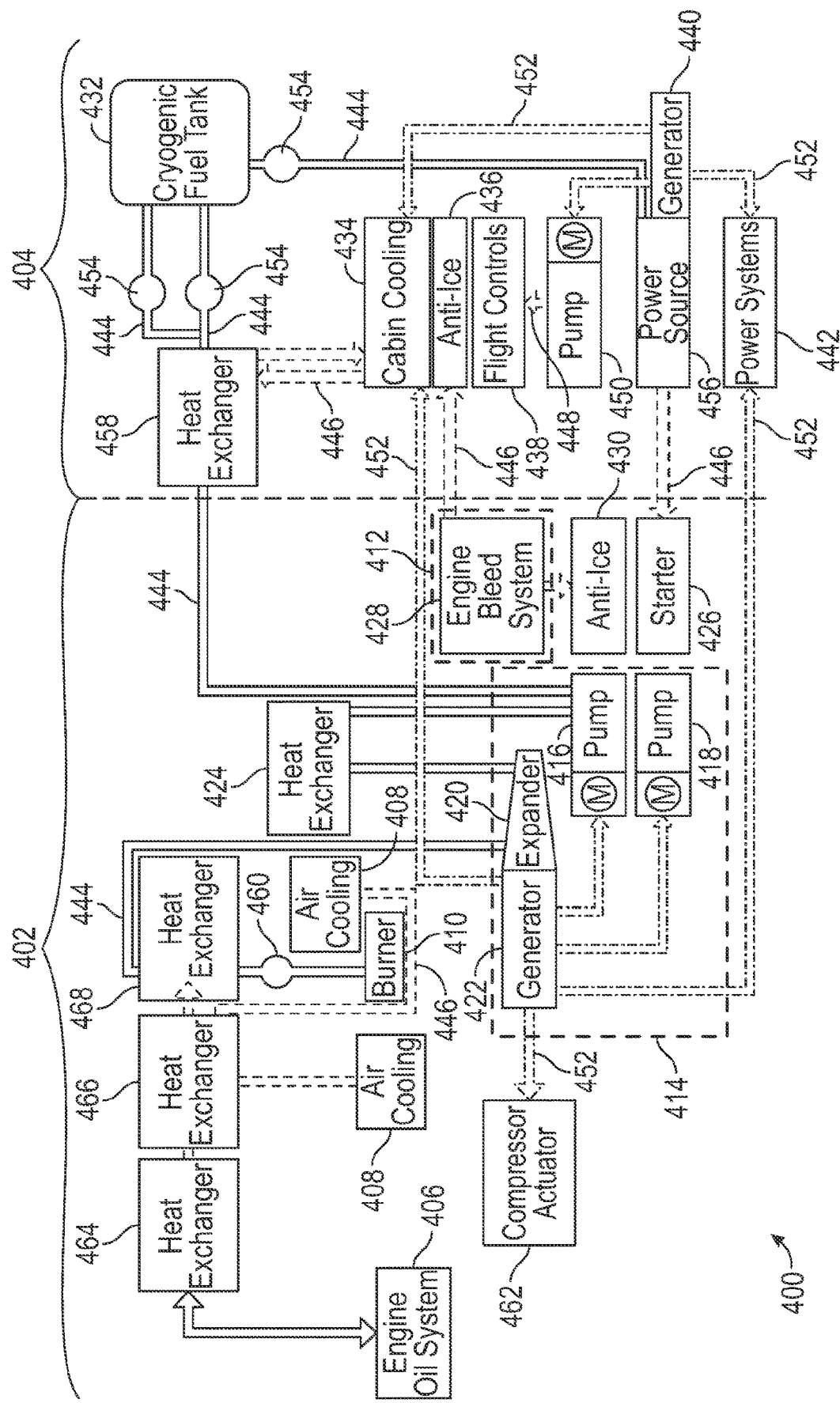
FIG. 4 is a schematic diagram of an aircraft propulsion system in accordance with an embodiment of the present disclosure.

Turning now to FIG. 4, a schematic diagram of an aircraft propulsion system 400 is shown. The aircraft propulsion system 400 includes engine systems 402 and aircraft systems 404. In accordance with embodiments of the present disclosure, the engine systems 402 include components, devices, and systems that are part of an aircraft engine, which may be wing-mounted or fuselage-mounted and the aircraft systems 404 are components, devices, and systems that are located separately from the engine, and thus may be arranged within various locations on a wing, within a fuselage, or otherwise located onboard an aircraft.

The engine systems 402 may include the components shown and described above, including, without limitation, a fan section, a compressor section, a combustor section, a turbine section, and an exhaust section. In this schematic illustration, without limitation, the engine systems 402 include an engine oil system 406, an air cooling system 408, a burner 410 (e.g., part of a combustion section), an anti-ice system 412, and a generator system 414. Those of skill in the art will appreciate that other systems, components, and devices may be incorporated into the engine system 402, and the illustrative embodiment is merely for explanatory and illustrative purposes. In this illustrative embodiment, a hydrogen high pressure pump 416 and an oil pump 418 are arranged as part of the generator system 414. The generator system 414 further includes an expander 420, an engine-side generator 422, and a hydrogen-air heat exchanger 424. An air turbine starter 426 is provided within the engine system 402. The anti-ice system 412 of the engine systems 402 includes an engine bleed system 428 that is configured to supply warm air to a cowl anti-ice system 430 to prevent ice buildup on an engine cowl.

The aircraft systems 404 include various features installed and present that are separate from but may be operably or otherwise connected to one or more of the engine systems 402. In this illustrative, non-limiting configuration, the aircraft systems 404 include one or more hydrogen tanks 432 configured to store liquid hydrogen onboard the aircraft, such as in tanks that are wing-mounted or arranged within the aircraft fuselage. The aircraft systems 404 include a cabin air cooling system 434, a wing anti-ice system 436, flight controls 438, one or more aircraft-side generators 440, and aircraft power systems 442.

The schematic diagram in FIG. 4 of the aircraft propulsion system 400 illustrates flow paths for different working fluids. For example, a hydrogen flow path 444 represents a flow path of liquid (or gaseous) hydrogen from the hydrogen tanks 432 to the burner 410. One or more air flow paths 446 represent airflow used for cooling and heat exchange with the hydrogen, and thus one or more heat exchangers or exchange systems may be provided to enable heat transfer from the air to the hydrogen, to cool the air and warm the hydrogen. A hydraulic fluid flow path 448 is illustrated fluidly connecting a hydraulic pump 450 to the flight controls 438. An electrical path 452 illustrates power generated by the generators 422, 440 and distribution of such power (e.g., from generators 422, 440 to aircraft power systems 442 and other electrical systems onboard an aircraft). As shown, one or more of the paths 444, 446, 448, 452 may cross between the engine systems 402 and the aircraft systems 404.

Referring to the hydrogen flow path 444, liquid hydrogen may be sourced or supplied from the hydrogen tanks 432. One or more pumps 454 may be arranged to boost a pressure of the hydrogen as it is supplied from the hydrogen tanks 432. In some configurations, the pumps 454 may be low pressure pumps, providing an increase in pressure of about 20 psid to 50 psid, for example. The hydrogen may be supplied to one or more combustion systems. For example, a portion of the hydrogen may be supplied to an auxiliary power source 456, such as an auxiliary power unit having a hydrogen burner or a hydrogen-based fuel cell. The auxiliary power source 456 may be part of the aircraft systems 404 and may be configured to direct air to the air turbine starter 426 along a section of an air flow path 446. Further, the auxiliary power source 456 may be configured to generate power at the generator 440 to supply power to the aircraft power system 442, the hydraulic pump 450, and/or the cabin air cooling system 434 and other ECS systems or other onboard electrically powered systems of the aircraft.

For propulsion onboard the aircraft, a portion of the hydrogen may be supplied from the hydrogen tanks 432 along the hydrogen flow path 444 to an aircraft-systems heat exchanger 458 which may include a hydrogen-air heat exchanger to cool air. The aircraft-systems heat exchanger 458 may be part of the aircraft systems 404. One or more low pressure pumps 454 may be arranged to boost a pressure of the hydrogen and thus heat the hydrogen before entering the aircraft-systems heat exchanger 458. In some embodiments, the aircraft-systems heat exchanger 458 may be part of an environmental control system (ECS) of the aircraft. The cooled air may be supplied, for example, to the cabin air cooling system 434. As this air is cooled, the hydrogen will be warmed within the aircraft-systems heat exchanger 458. The warmed hydrogen may then be passed from the aircraft system 404 to the engine systems 402. As shown, the hydrogen may flow through a portion of the hydrogen flow path 444 to the hydrogen high pressure pump 416. The hydrogen high pressure pump 416 is configured to increase the pressure of the warmed hydrogen to maintain a pressure above a combustor pressure and/or above a critical pressure in order to avoid a phase change to gas in the plumbing, piping, flow path, or heat exchangers, for example.

The boosted pressure hydrogen may then be conveyed to a second heat exchanger. In this configuration, the second heat exchanger is the hydrogen-air heat exchanger 424 of the generator system 414. The second heat exchanger 424 of this embodiment may be a hydrogen-air heat exchanger arranged proximate an exit or nozzle of the engine systems 402 (e.g., exhaust air heat exchanger). In the second heat exchanger 424, the temperature of the hydrogen is further raised. Next, the hydrogen may be passed through the expander 420 of the generator system 414. As the hydrogen is expanded through the expander 420, a turbine may be driven to generate power at the engine-side generator 422. In one non-limiting example, the aircraft-side generator 440 may be configured to generate about 120 kw whereas the engine-side generator 422 may be configured to generate about 300 kw. That is, in accordance with some embodiments of the present disclosure, the engine-side generator 422 may be configured to generate more power than the aircraft-side generator 440. The expanded hydrogen may then be directed into (e.g., injected) the burner 410, with such supply of hydrogen to the burner 410 controlled by a valve 460. In some embodiments, and as shown, an electric compressor actuator 462 may be included within the engine systems 402. The electric compressor actuator 462 may be configured to boost a pressure of the hydrogen prior to injection into the burner 410.

The engine systems 402 may further include one or more heat exchangers 464, 466 configured to provide heat exchange onboard the engine. These additional heat exchangers may not be part of the hydrogen flow path 444. For example, an air-oil heat exchanger 464 and an air-air heat exchanger 466 may be arranged for appropriate cooling (or heating) as will be appreciated by those of skill in the art. In some non-limiting embodiments, a post-expander hydrogen-air heat exchanger 468 may be arranged between the expander 420 and the burner 410 and may be used for cooled cooling air, for example.

Using the architecture illustrated in FIG. 4, and in accordance with embodiments of the present disclosure, the hydrogen may be used as a heat sink to provide increased cooling capacity as compared to other cooling schemes. For example, using liquid or supercritical hydrogen can, in some configurations, provide up to ten times the cooling capacity of prior systems. The hydrogen may be used at various locations along the hydrogen flow path 444 to provide cooling to one or more systems, as noted above. For example, the hydrogen can provide cooling to onboard electronics, generators, air for cooling purposes, etc. The pumps 416, 454 act to increase the temperature of the hydrogen. Use of low pressure pumps (e.g., pumps 454) can allow cooling of cooler heat sources (e.g., onboard electronics) whereas a high pressure pump (e.g., pump 416) can be used to boost the pressure of the hydrogen prior to passing through the hydrogen-air heat exchanger 424 and into the expander 420. Further, because the hydrogen is low temperature at the aircraft-systems heat exchanger 458, the hydrogen may act as an efficient heat sink for air. As such, the cabin air conditioning system 434 and other aspects of onboard ECS can be reduced in size, weight, and complexity.

In operation, the hydrogen high pressure pump 416, the hydrogen-air heat exchanger 424, and the expander 420 may be configured to employ the full heat capacity of the hydrogen. For example, the hydrogen may be heated to, but not exceed, an auto-ignition temperature. To achieve this, the hydrogen high pressure pump 416 and the hydrogen-air heat exchanger 424 of the generator system 414 may be sized and configured to increase the temperature of the hydrogen such that it is near the auto-ignition temperature as it passes through the expander 420. The increased pressure and temperature of the hydrogen results in an overheated and/or over pressurized hydrogen that is passed into the expander 420. As such, the engine-side generator 422 may extract the most work from the hydrogen and generate electrical power within the engine systems 402.

Advantageously, embodiments of the present disclosure are directed to improved turbine engine systems that employ non-hydrocarbon fuels at cryogenic temperatures. In accordance with some embodiments, the systems described herein provide for a hydrogen-burning turbine engine that may allow the cryogenic fuel to recover heat from various systems such as waste heat-heat exchangers, system component heat exchangers, and expansion turbines. Accordingly, improved propulsion systems that burn hydrogen and implement improved cooling schemes in both aircraft systems and engine systems are provided. Further, embodiments of the present disclosure may be configured to use the full heat capacity of the hydrogen, up to the auto-ignition point. Further, advantageously, through the use of a hydrogen flow path through a high pressure pump, heat exchanger, and expander, additional electrical power may be generated onboard an aircraft engine system.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft propulsion system, comprising:
    aircraft systems comprising at least one hydrogen tank configured to store liquid hydrogen, an aircraft-systems heat exchanger configured to receive hydrogen from the at least one hydrogen tank, a cabin air cooling system, a wing anti-ice system, aircraft power systems, and an aircraft-side generator; and
    engine systems comprising at least a main engine core, an engine-side generator, a high pressure pump, a hydrogen-air heat exchanger, an expander, and a post-expander hydrogen-air heat exchanger, wherein the main engine core comprises a compressor section, a combustor section having a burner, and a turbine section;
    wherein hydrogen is supplied from the at least one hydrogen tank through a hydrogen flow path, passing through the aircraft-systems heat exchanger, the high pressure pump, the hydrogen-air heat exchanger, the expander, and the post-expander hydrogen-air heat exchanger, prior to being injected into the burner for combustion,
    wherein the aircraft systems include an auxiliary power source coupled the aircraft-side generator, wherein the auxiliary power source is configured to receive hydrogen from the at least one hydrogen tank to generate power at the aircraft-side generator to supply the generated power to at least the cabin air cooling system, the aircraft power systems, and the wing anti-ice system,
    wherein the expander is driven to generate power at the engine-side generator coupled to the expander and configured to supply power to the high pressure pump, the aircraft power systems, and the cabin air cooling system, and
    wherein the aircraft-systems heat exchanger receives the hydrogen as a first working fluid and air as a second working fluid, wherein the air of the aircraft-systems heat exchanger is supplied to the cabin air cooling system.

2. The aircraft propulsion system of claim 1, wherein the engine-side generator is configured to generate at least 300 kw of electrical power.

3. The aircraft propulsion system of claim 1, wherein the auxiliary power source is a fuel cell.

4. The aircraft propulsion system of claim 1, wherein the auxiliary power source includes a burner for combusting the hydrogen to generate power.

5. The aircraft propulsion system of claim 1, wherein the auxiliary power source is configured to generate at least 100 kw of electrical power.

6. The aircraft propulsion system of claim 1, further comprising at least one pump arranged along the hydrogen flow path between the at least one hydrogen tank and the aircraft-systems heat exchanger.

7. The aircraft propulsion system of claim 1, wherein the expander is arranged between the hydrogen-air heat exchanger and the burner along the hydrogen flow path.

8. The aircraft propulsion system of claim 1, further comprising a valve arranged along the hydrogen flow path between the expander and the burner, the valve configured to control a flow of hydrogen into the burner.

9. The aircraft propulsion system of claim 1, wherein the hydrogen enters the expander at temperatures up to the auto-ignition temperature of the hydrogen.

10. An aircraft comprising:
    a main engine core having a compressor section, a combustor section having a burner, and a turbine section;
    engine systems comprising the main engine core, an engine-side generator, a high pressure pump, a hydrogen-air heat exchanger, an expander, and a post-expander hydrogen-air heat exchanger;
    aircraft systems comprising at least one hydrogen tank configured to store liquid hydrogen, an aircraft-systems heat exchanger arranged remote from the main engine core and configured to receive hydrogen from the at least one hydrogen tank, a cabin air cooling system, a wing anti-ice system, aircraft power systems, and an aircraft-side generator; and
    a hydrogen flow path configured to supply hydrogen from the at least one hydrogen tank to the burner of the combustor section,
    wherein the hydrogen flow path is arranged to direct hydrogen through the aircraft-systems heat exchanger, the high pressure pump downstream of the aircraft-systems heat exchanger, the hydrogen-air heat exchanger, the expander, and the post-expander hydrogen-air heat exchanger, prior to being injected into the burner for combustion, wherein the hydrogen exits the hydrogen-air heat exchanger at temperatures up to the auto-ignition temperature of the hydrogen,
    wherein the aircraft systems include an auxiliary power source configured to receive hydrogen from the at least one hydrogen tank to generate power, wherein the auxiliary power source is coupled to the aircraft-side generator to supply power to at least the cabin air cooling system, the aircraft power systems, and the wing anti-ice system,
    wherein the expander is driven to generate power at the engine-side generator coupled to the expander and configured to supply power to the high pressure pump, the aircraft power systems, and the cabin air cooling system, and
    wherein the aircraft-systems heat exchanger receives the hydrogen as a first working fluid and air as a second working fluid, wherein the air of the aircraft-systems heat exchanger is supplied to the cabin air cooling system.

11. The aircraft of claim 3, further comprising a valve arranged along the hydrogen flow path between the expander and the burner, the valve configured to control a flow of hydrogen into the burner.

12. The aircraft of claim 10, wherein the auxiliary power source is a fuel cell.

13. The aircraft of claim 10, wherein the auxiliary power source includes a burner for combusting the hydrogen to generate power.

14. The aircraft of claim 10, wherein the auxiliary power source is configured to generate at least 100 kw of electrical power.

\* \* \* \* \*